United States Patent
Folickman et al.

(10) Patent No.: US 10,654,652 B1
(45) Date of Patent: May 19, 2020

(54) EXTENDIBLE BELT CONVEYOR AND TRANSFER PLATES FOR SAME

(71) Applicant: Santa Rosa Systems, LLC, Mount Washington, KY (US)

(72) Inventors: Marion Folickman, Louisville, KY (US); Carl David Graston, Sellersburg, IN (US); Paul Receveur, New Albany, IN (US)

(73) Assignee: Santa Rosa Systems, LLC, Mt. Washington, KY (US)

( * ) Notice: Subject to any disclaimer, the term of this patent is extended or adjusted under 35 U.S.C. 154(b) by 0 days.

(21) Appl. No.: 16/405,275

(22) Filed: May 7, 2019

Related U.S. Application Data (60) Provisional application No. 62/730,382, filed on Sep. 12, 2018.

(51) Int. Cl.
  *B65G 47/66* (2006.01)
  *B65G 15/00* (2006.01)
  *B65G 21/14* (2006.01)
(52) U.S. Cl.
  CPC .................................. *B65G 21/14* (2013.01)
(58) Field of Classification Search
  CPC ......... B65G 15/00; B65G 21/14; B65G 47/66
  USPC ...................................... 198/539, 812, 844.2
  See application file for complete search history.

(56) References Cited

U.S. PATENT DOCUMENTS

| | | | | |
|---|---|---|---|---|
| 3,788,452 A | * | 1/1974 | McWilliams | B65G 21/14 198/313 |
| 4,279,555 A | * | 7/1981 | Rydell | B65G 57/112 198/382 |
| 4,684,008 A | * | 8/1987 | Hayashi | B65G 47/71 198/431 |
| 4,946,027 A | * | 8/1990 | Jenkins | B65G 21/12 182/2.11 |
| 5,351,809 A | * | 10/1994 | Gilmore | B65G 21/14 198/594 |
| 5,788,461 A | * | 8/1998 | Easton | B65G 59/08 198/594 |
| 5,896,981 A | * | 4/1999 | Walsh | F16G 3/02 198/844.2 |
| 5,971,129 A | * | 10/1999 | Stawniak | B66B 29/08 198/324 |
| 6,431,346 B1 | * | 8/2002 | Gilmore | B65G 21/14 198/588 |

(Continued)

*Primary Examiner* — Douglas A Hess
(74) *Attorney, Agent, or Firm* — Stites & Harbison, PLLC; David W. Nagle, Jr.

(57) ABSTRACT

An extendible belt conveyor includes a penultimate section, a boom mounted for pivotal movement with respect to the penultimate section, and a transfer plate spanning between the belt of the boom and the belt of the penultimate section. The transfer plate includes a plurality of first components and a plurality of second components that each include a base member mounted on and rotatable with respect to a rod, and a flange member extending from the base member and positioned adjacent to one of the belts of the boom or penultimate section, with a distal edge of the flange member extending over the belt. As the boom pivots, an upper surface of the plurality of first components remains substantially parallel to the belt of the boom, and an upper surface of the plurality of second components remains substantially parallel to the belt of the penultimate section.

14 Claims, 12 Drawing Sheets

(56) References Cited

U.S. PATENT DOCUMENTS

| | | | | |
|---|---|---|---|---|
| 6,481,563 B1* | 11/2002 | Gilmore | ............... | B65G 21/14 198/511 |
| 7,909,153 B2* | 3/2011 | Pogue | ............... | B65G 21/14 198/312 |
| 8,262,334 B2* | 9/2012 | Christensen | ............... | B64F 1/32 414/398 |
| 8,365,899 B2* | 2/2013 | McKee | ............... | B65G 47/66 198/539 |
| 8,464,859 B2* | 6/2013 | Campbell | ............... | B65G 13/12 198/588 |
| 8,622,199 B2* | 1/2014 | Windfeld | ............... | B65G 41/005 198/588 |
| 8,662,291 B2* | 3/2014 | Henderson | ............... | B65G 21/14 198/588 |
| 8,714,334 B2* | 5/2014 | Yang | ............... | B65G 47/8823 193/35 TE |
| 8,944,239 B2* | 2/2015 | Campbell | ............... | B65G 67/08 198/588 |
| 9,174,805 B2* | 11/2015 | Mallaghan | ............... | B65G 21/14 |
| 9,452,896 B2* | 9/2016 | Lee | ............... | B65G 47/66 |
| 9,604,787 B1* | 3/2017 | Baek | ............... | B65G 67/08 |
| 9,950,868 B1* | 4/2018 | Baek | ............... | B65G 23/22 |
| 10,427,891 B2* | 10/2019 | McKee | ............... | B65G 47/66 |

\* cited by examiner

EXTENDIBLE BELT CONVEYOR AND TRANSFER PLATES FOR SAME

CROSS-REFERENCE TO RELATED APPLICATIONS

The present application claims priority to U.S. Patent Application Ser. No. 62/730,382 filed on Sep. 12, 2018, the entire disclosure of which is incorporated herein by reference.

BACKGROUND OF THE INVENTION

Extendible belt conveyors are well-known in the industry and are often comprised of multiple aligned sections that collectively define a conveying surface. Certain extendible belt conveyors include a final section (or boom) that can be pivoted relative to the remaining sections of the conveyor. When a conveyor includes such a boom, during use there is a gap between the boom and the adjacent section of the extendible belt conveyor. Such a gap can, at times, prevent smooth transfer of parcels to and from the boom. Transfer plates exist to facilitate movement across this gap, but known transfer plates are unable to effectively accommodate movement of the boom.

SUMMARY OF THE INVENTION

The present invention is an extendible belt conveyor that includes a transfer plate which extends between sections of the conveyor that pivot relative to each other.

An exemplary extendible belt conveyor made in accordance with the present invention includes a base with multiple telescoping sections and a boom, which is mounted for pivotal movement with respect to the adjacent telescoping section, which may also be referred to as the penultimate section.

The penultimate section includes a belt which is operated, in part, by a roller at a distal end of the penultimate section. Likewise, the boom includes a belt which is operated, in part, by a roller at a proximal end of the boom. Thus, parcels are transferred from the conveying surface defined by the belt of the penultimate section to the conveying surface defined by the belt of the boom, or vice versa. There is a gap between the roller and belt associated with the boom of the belt conveyor and the roller and belt associated with the penultimate section of the belt conveyor. A transfer plate of the present invention is used to bridge this gap. However, because the boom can be pivoted to a substantially vertical orientation, or it can be pivoted downward relative to the substantially horizontal conveying surface, any such transfer plate must be able to accommodate such pivoting movement.

One exemplary transfer plate made in accordance with the present invention includes a rod and an alternating series of components mounted to rotate relative to and around the rod, i.e., about an axis of rotation defined by the rod. In particular, a plurality of first components and a plurality of second components are preferably arranged in pairs along the length of the rod.

In some embodiments, each of the first components includes a base member mounted to rotate around the rod and a flange member extending from the base member adjacent to the belt of the boom, with a distal edge of the flange member extending over the belt of the boom. Similarly, each of the second components includes a base member mounted to rotate around the rod and a flange member extending from the base member adjacent to the belt of the penultimate section, with a distal edge of the flange member extending over the belt of the penultimate section.

In some embodiments, each of the base members is about one-half the width of the respective flange members. As such, the base members of the plurality of first components are arranged in an alternating relationship with the base members of the plurality of second components along the rod, but the distal edges of the plurality of first components collectively extend across substantially an entire width of the belt of the boom, and the distal edges of the plurality of second components collectively extend across substantially an entire width of the belt of the penultimate section.

In some embodiments, each of the first components includes a lower lip that extends from the base member opposite from the distal edge of the flange member of the first component, and each of the second components includes a lower edge opposite the distal edge of the flange member of the second component. In certain embodiments, when the boom is in the substantially horizontal orientation, the lower lip of the first component contacts the lower edge of the second component, and the upper surface of the first component is substantially aligned with the upper surface of the second component, so as to provide a substantially flat continuous surface between the belt of the boom and the belt of the penultimate section.

Another exemplary transfer plate made in accordance with the present invention includes a plurality of first components and a plurality of second components arranged in pairs along a rod, but each of the plurality of first components includes multiple base members joined to and connected by a single flange member. Likewise, each of the plurality of second components includes multiple base members joined to and connected by a single flange member. Each of the multiple base members of the plurality of first components is arranged in an alternating relationship with each of the multiple base members of the plurality of second components along the rod. The width of each of the multiple base members of the first component is substantially equal to the width of each of the multiple base members of the second component, and they are all substantially equal and about one-third the width of the respective flange members. Accordingly, the distal edges of the plurality of first components still collectively extend across substantially an entire width of the belt of the boom, and the distal edges of the plurality of second components still collectively extend across substantially an entire width of the belt of the penultimate section.

In some embodiments, the transfer plate further includes torsion springs that each engage one of the plurality of first components and one of the plurality of second components to bias the first component towards the belt of the boom and the second component towards the belt of the penultimate section.

DESCRIPTION OF THE INVENTION

The present invention is an extendible belt conveyor that includes a transfer plate which extends between sections of the conveyor that pivot relative to each other.

Figure 1:
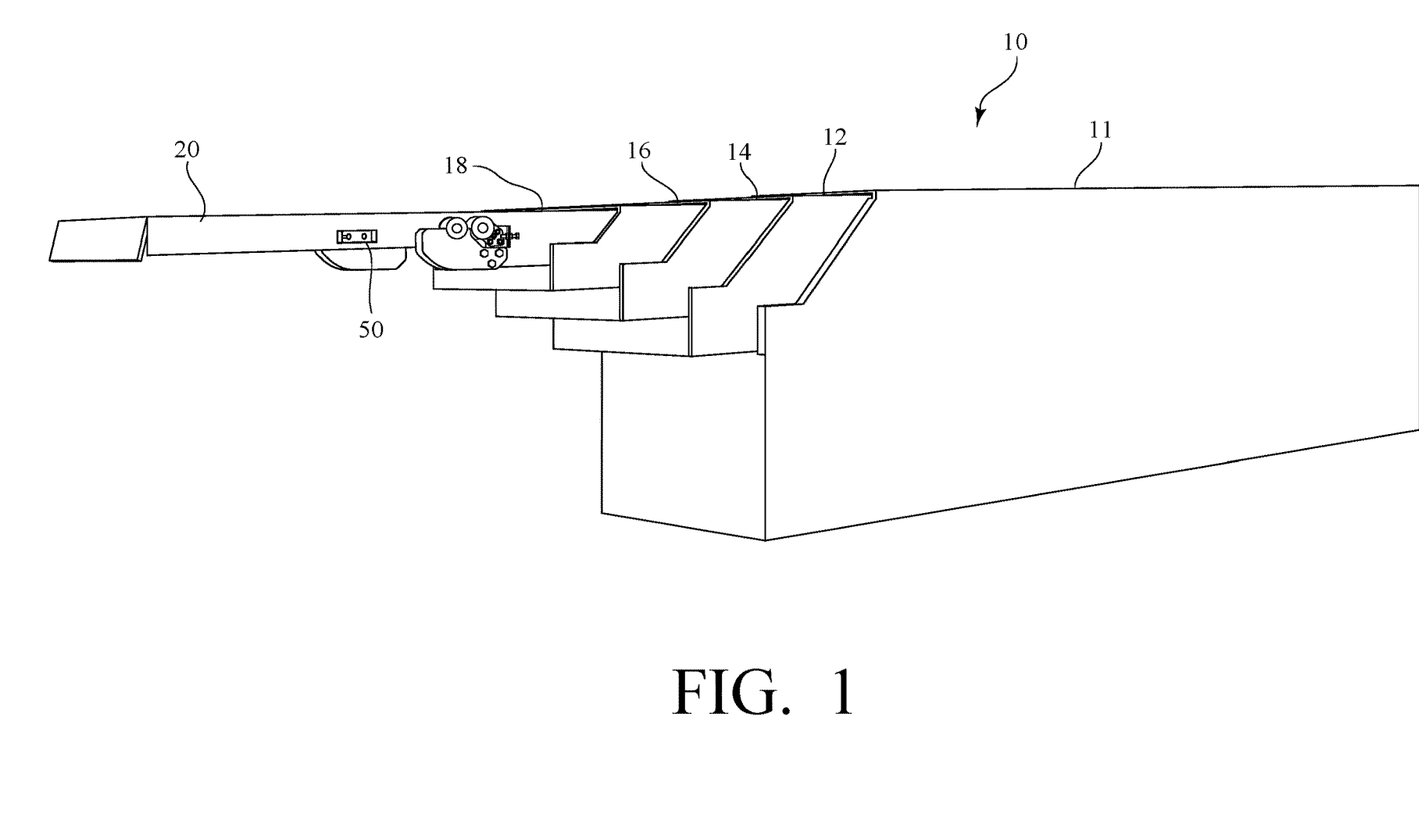
FIG. 1 is a perspective view of an exemplary extendible belt conveyor made in accordance with the present invention, in which the telescoping sections of the conveyor are in a retracted position.
Figure 1A:
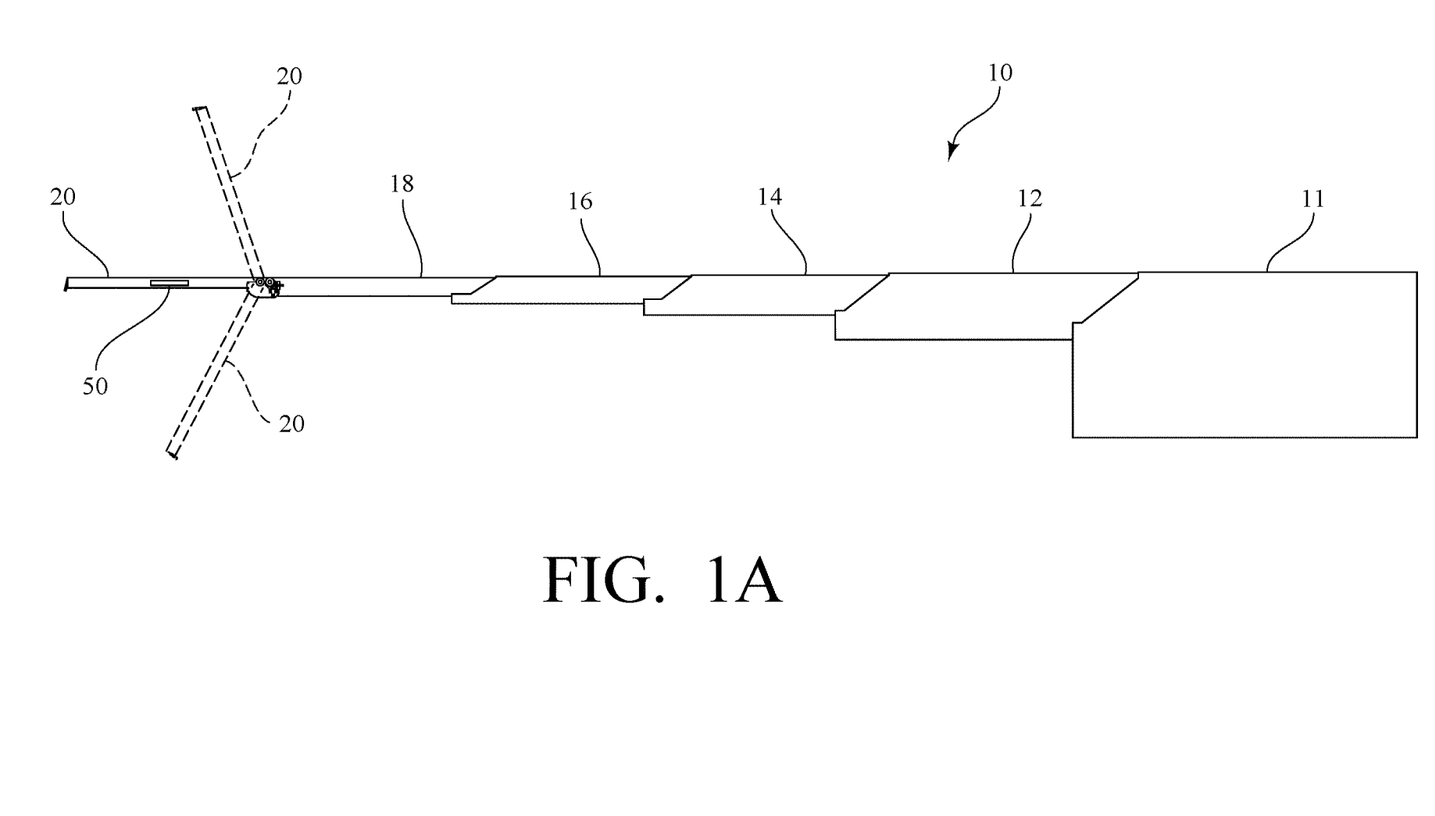
FIG. 1A is a side view of the exemplary extendible belt conveyor of FIG. 1, in which the telescoping sections of the conveyor are in an extended position.

FIG. 1 is a perspective view of an exemplary extendible belt conveyor 10 made in accordance with the present invention in a retracted position, and FIG. 1A is a side view of the extendible belt conveyor 10 in an extended position. As shown in FIGS. 1 and 1A, the extendible belt conveyor 10 includes a base 11 with multiple telescoping sections 12, 14, 16, 18, each of which define a conveying surface. In this example, there are four such telescoping sections 12, 14, 16, 18, although fewer or more telescoping sections could be incorporated into the extendible belt conveyor 10 without departing from the spirit and scope of the present invention. Indeed, in certain embodiments, the conveyor may include no telescoping sections at all. More importantly, as also shown in FIGS. 1 and 1A, the extendible belt conveyor 10 includes a boom 20, which is mounted for pivotal movement with respect to the penultimate section 18 of the extendible belt conveyor 10.

As best shown in FIG. 1A, the boom 20 of the extendible belt conveyor 10 does not retract into the penultimate section 18 in a telescoping relationship. Rather, the boom 20 is mounted to the penultimate section 18, such that it can pivot about a substantially horizontal axis relative to the penultimate section 18 between a substantially horizontal orientation where it serves as the final section of the conveying surface and a substantially vertical orientation, where it is in a stowed position. In most cases, it is presumed that the boom 20 would be pivoted upward into the stowed position. However, it is also possible that the boom 20 could be pivoted downward into the stowed position.

Figure 4:
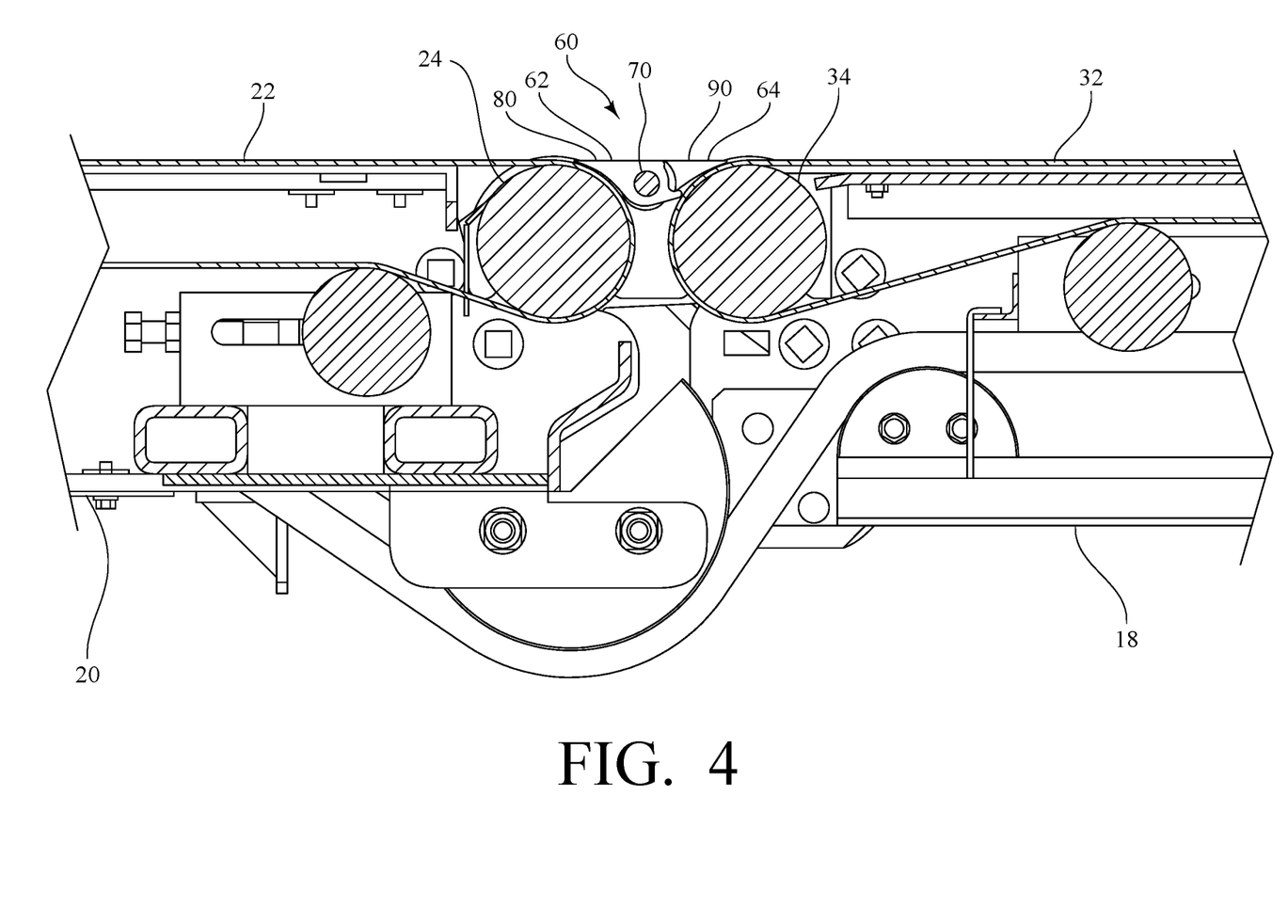
FIG. 4 is a partial sectional view of the exemplary extendible belt conveyor of FIG. 2 taken along line 4-4 in FIG. 2, illustrating components of an exemplary transfer plate made in accordance with the present invention.

Referring again to FIGS. 1 and 1A, along with the partial sectional view of FIG. 4, the penultimate section 18 includes a belt 32 which is operated, in part, by a roller 34 at a distal end 36 of the penultimate section 18. Likewise, the boom 20 includes a belt 22 which is operated, in part, by a roller 24 at a proximal end 26 of the boom 20. Thus, parcels (not shown) are transferred from the conveying surface defined by the belt 32 to the conveying surface defined by the belt 22, or vice versa.

Figure 3:
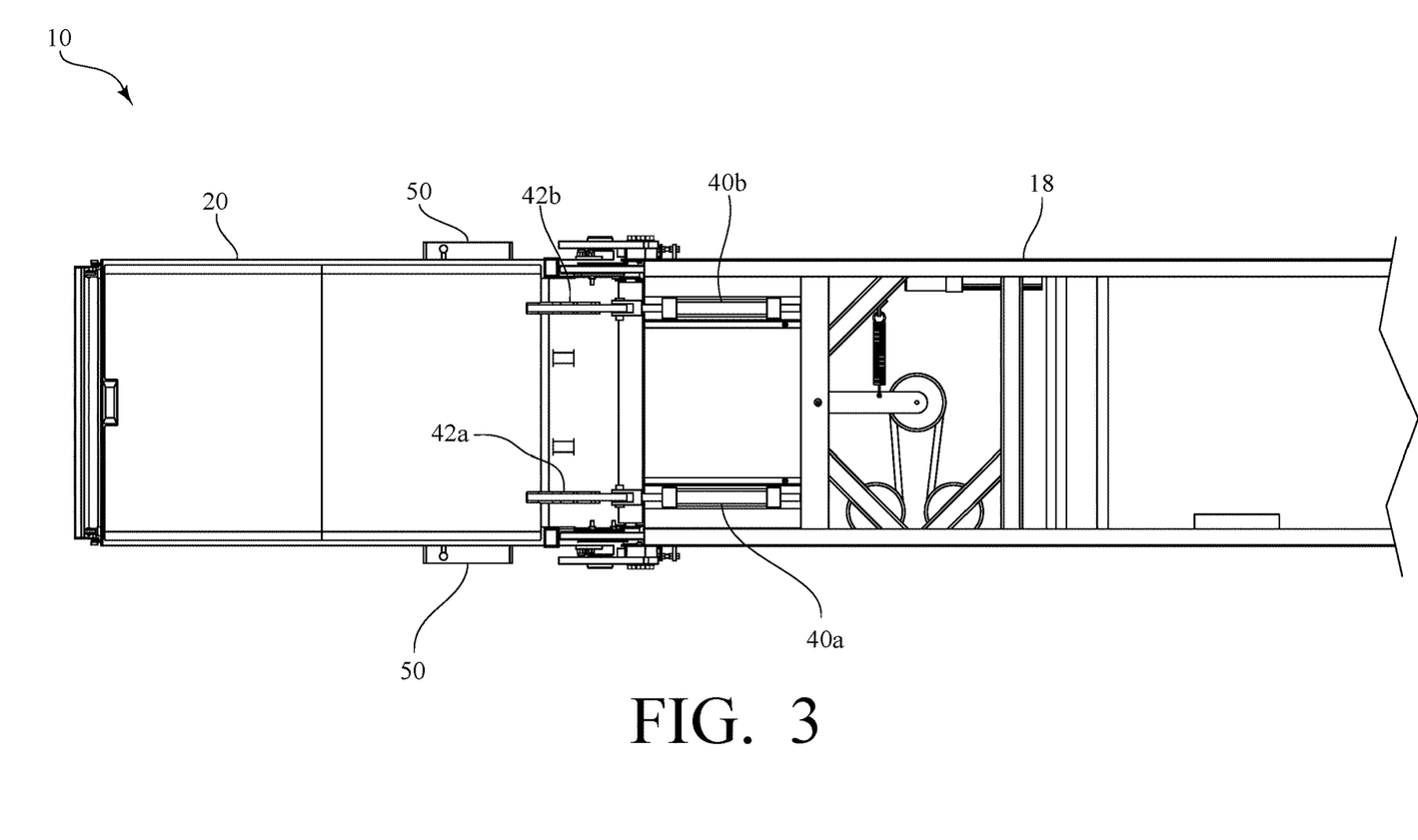
FIG. 3 is a partial bottom view of the exemplary extendible belt conveyor of FIG. 2.

FIG. 3 is partial bottom view of the exemplary extendible belt conveyor of FIGS. 1 and 1A. As shown in FIG. 3, in this exemplary embodiment, there are two hydraulic cylinders 40a, 40b and associated linkages 42a, 42b, which facilitate pivoting of the boom 20 relative to the penultimate section 18 of the extendible belt conveyor 10.

In the extendible belt conveyor 10, user controls for controlling operation of the conveyor, which are generally indicated by reference number 50, are located on one or both side surfaces of the boom 20.

Referring now to FIG. 4, there is a gap between (i) the roller 24 and the belt 22 associated with the boom 20 of the extendible belt conveyor 10, and (ii) the roller 34 and the belt 32 associated with the penultimate section 18 of the extendible belt conveyor 10. A transfer plate 60 of the present invention is used to bridge this gap. However, because the boom 20 can be pivoted between a substantially horizontal orientation where it serves as the final section of the conveying surface and a substantially vertical orientation, where it is in a stowed position, the transfer plate 60 must be able to accommodate such pivoting movement.

Figure 5:
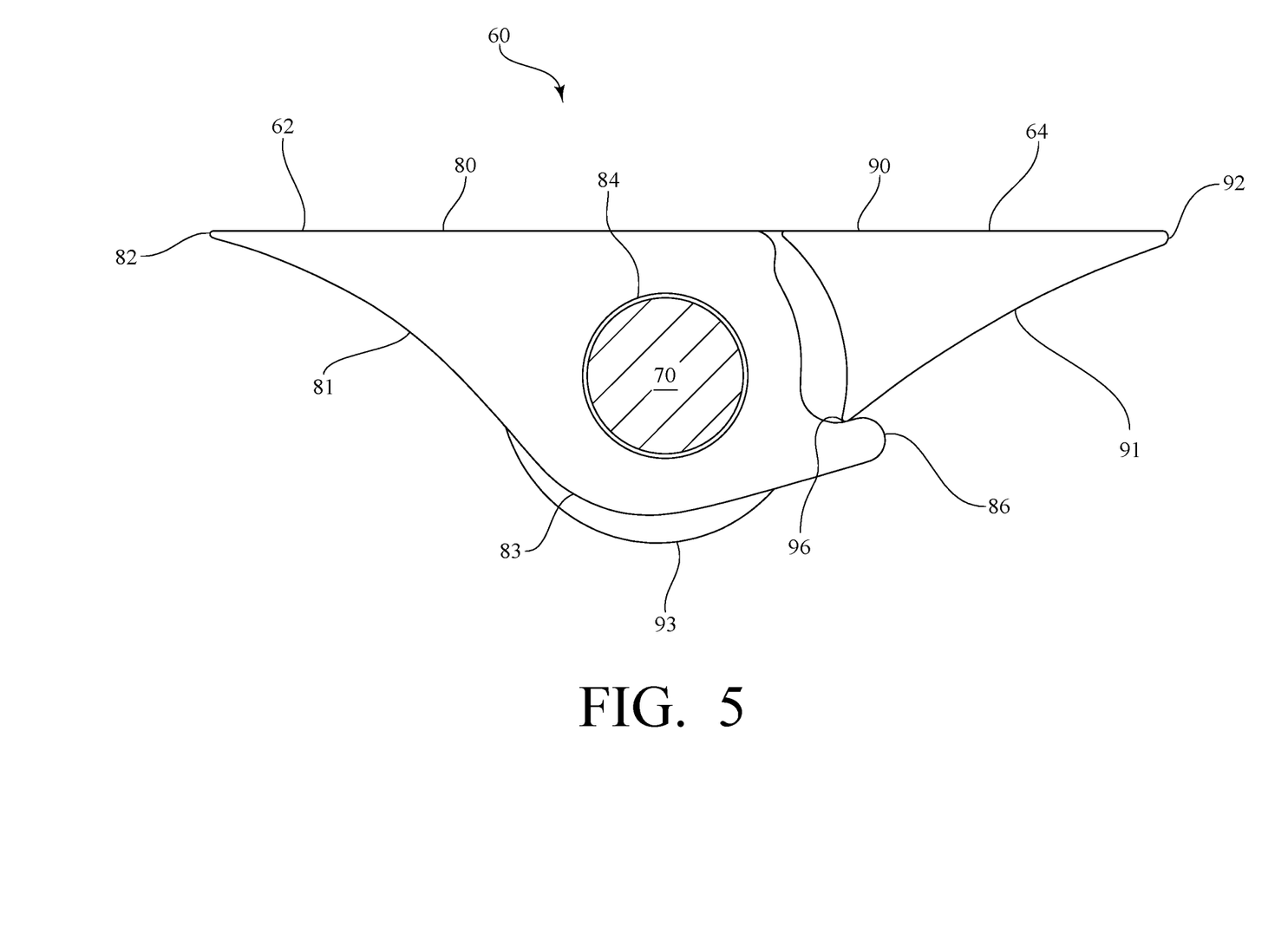
FIG. 5 is a side view illustrating, in isolation, the exemplary transfer plate of FIG. 4.
Figure 6:
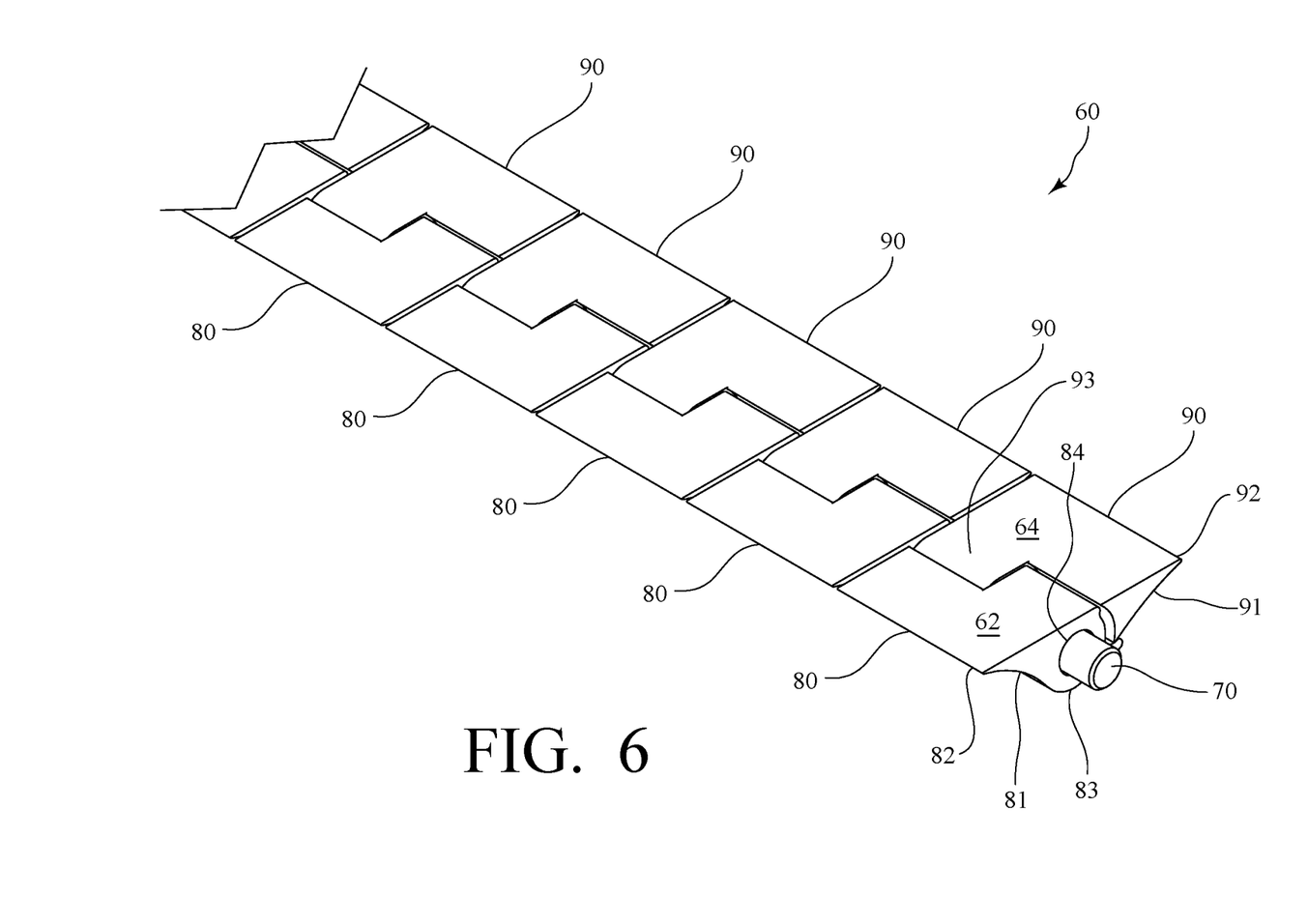
FIG. 6 is a partial top perspective view of the exemplary transfer plate of FIG. 5.
Figure 7:
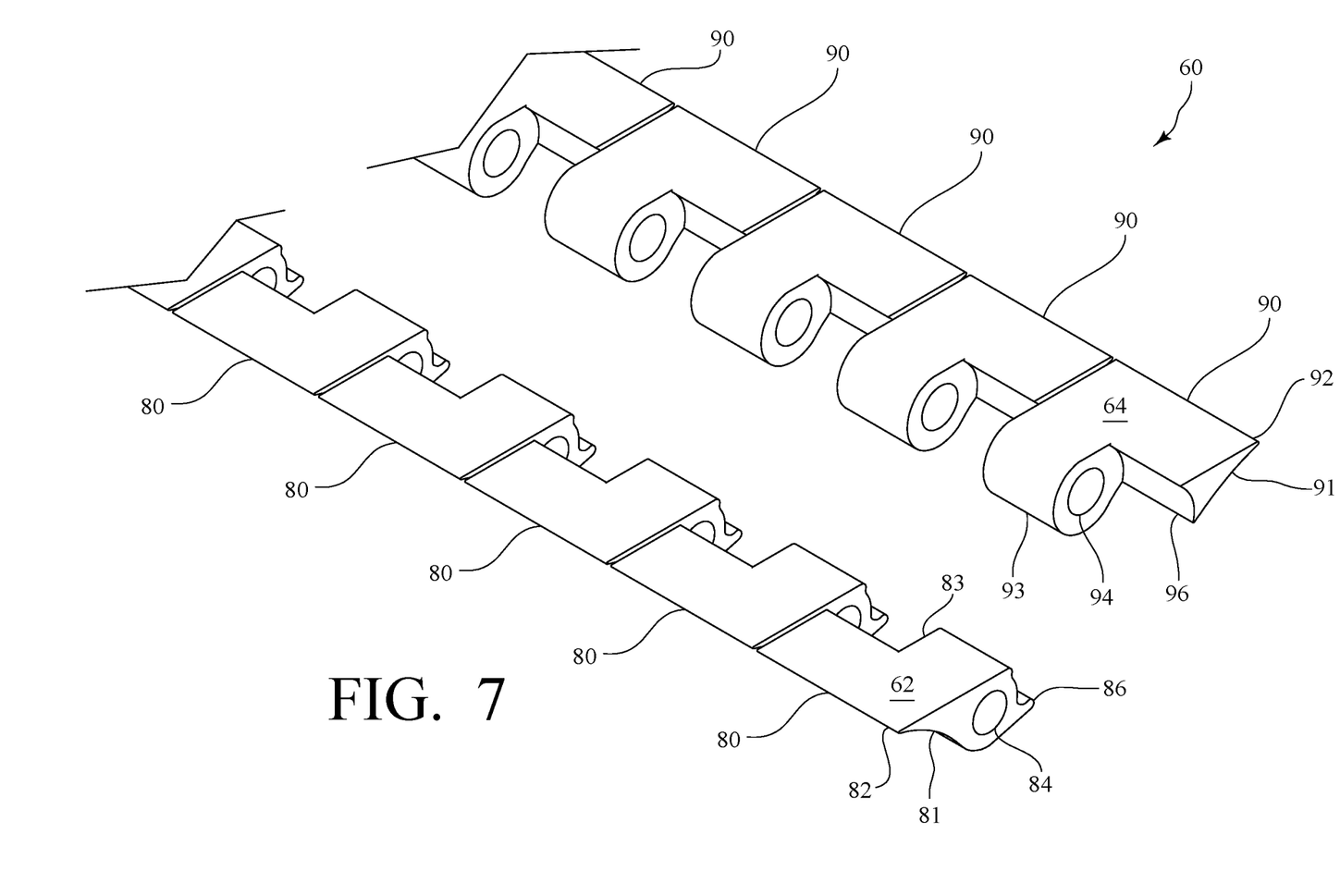
FIG. 7 is a partial exploded perspective view of the exemplary transfer plate of FIG. 5.

Referring still to FIG. 4, but now also to FIGS. 5-7, one exemplary transfer plate 60 made in accordance with the present invention includes (i) a rod 70, which is positioned between the boom 20 and the penultimate section 18 and extends substantially parallel to the roller 24 of the boom 20 and the roller 34 of the penultimate section 18, and (ii) an alternating series of components mounted to rotate relative to and around the rod 70, i.e., about an axis of rotation defined by the rod 70. In particular, a plurality of first components 80 and a plurality of second components 90 are arranged along the length of the rod 70, with one first component 80 and one second component 90 forming a pair.

Referring still to FIGS. 4-7, each of the first components 80 includes a base member 83, which defines a hole 84 which accepts the rod 70, such that each first component 80 can be mounted on the rod 70 and can rotate with respect to the rod 70. Each of the first components 80 also includes a flange member 81 extending from the base member 83, which, in use, is configured to be positioned adjacent to the belt 22 of the boom 20, with a distal edge 82 of the flange member 81 extending over the belt 22 of the boom 20. Similarly, each of the second components 90 includes a base member 93, which defines a hole 94 which accepts the rod 70, such that each second component 90 can be mounted on the rod 70 and can rotate with respect to the rod 70. Each of the second components 90 also includes a flange member 91 extending from the base member 93, which, in use, is configured to be positioned adjacent to the belt 32 of the penultimate section 18, with a distal edge 92 of the flange member 91 extending over the belt 32 of the penultimate section 18.

As a result of the construction described above, as the boom 20 is pivoted with respect to the penultimate section 18, each of the first components 80 is capable of rotating along with the boom 20, so that an upper surface 62 of the first components 80 remains substantially parallel to the belt 22 of the boom 20. At the same time, each of the second components 90 remains properly positioned over and adjacent to the belt 32 of the penultimate section 18 of the extendible belt conveyor 10, so that an upper surface 64 of the second components 90 remains substantially parallel to the belt 32 of the penultimate section 18.

Referring still to FIGS. 4-7, with the first components 80 and the second components 90 arranged in pairs (i.e., one first component 80 and one second component 90 forming a pair), the base members 83 of the plurality of first components 80 are arranged in an alternating relationship with the base members 93 of the plurality of second components 90 along the rod 70. In this exemplary embodiment, each of the base members 83, 93 is about one-half the width of the respective flange members 81, 91. As such, and referring now to FIG. 2, even with the base members 83, 93 arranged in the alternating relationship, the distal edges 82 of the plurality of first components 80 of the transfer plate 60 collectively extend across substantially the entire width of the belt 22 of the boom 20, and the distal edges 92 of the plurality of second components 90 of the transfer plate 60 collectively extend across substantially the entire width of the belt 32 of the penultimate section 18.

Figure 2:
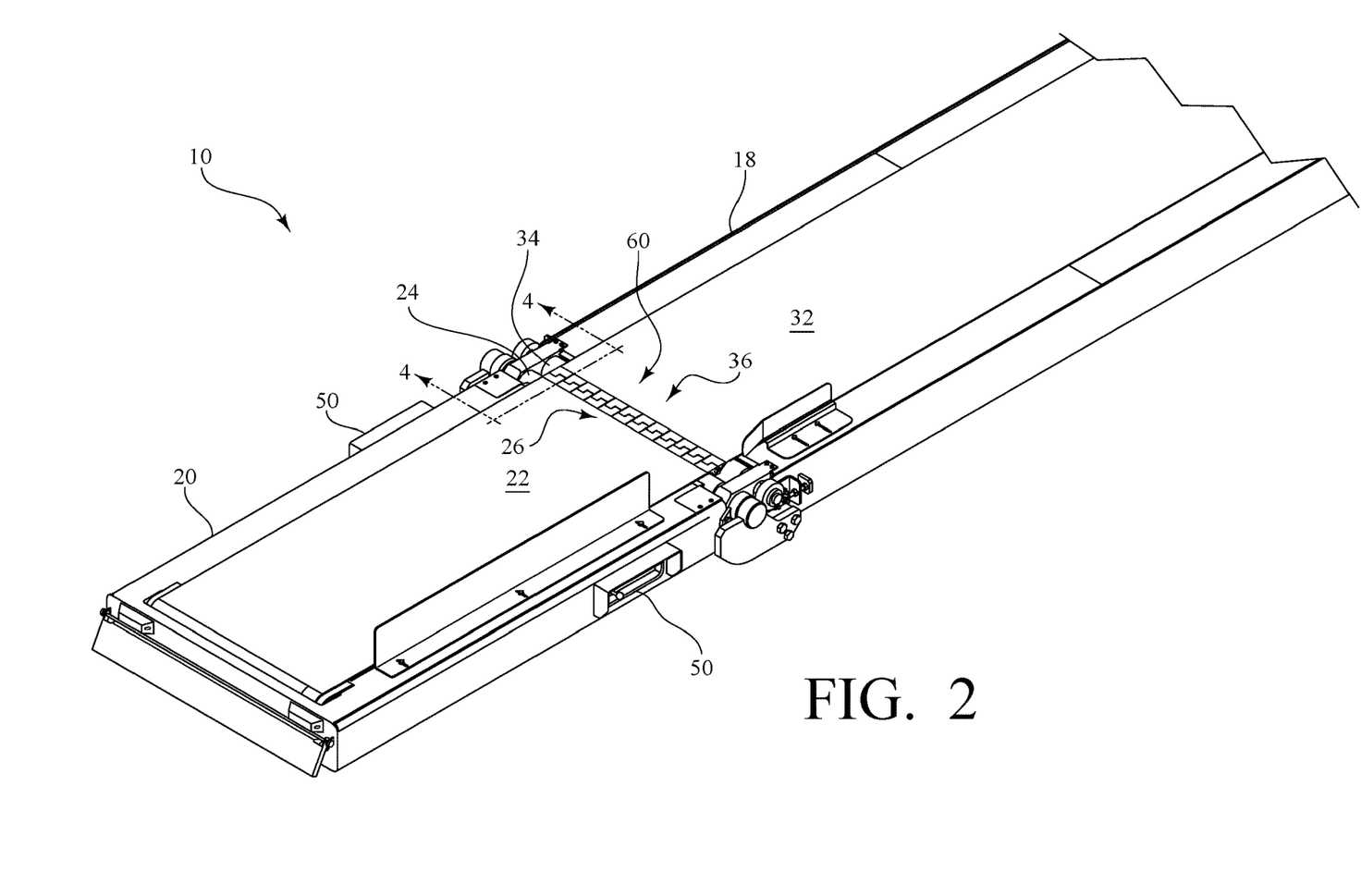
FIG. 2 is a partial top perspective view of the exemplary extendible belt conveyor of FIGS. 1 and 1A.

Referring still to FIG. 2, in this exemplary embodiment, there are twelve such pairs, but the particular number of pairs is not limited and can be chosen based on the width of the first and second components 80, 90 of the transfer plate 60 as compared to the width of the belt 22 of the boom 20 and the width of the belt 32 of the penultimate section 18. For example, in an embodiment where the respective first and second components 80, 90 of the transfer plate 60 are each about 2.5 inches wide, and each of the belts 22, 32 are approximately 36 inches wide, fifteen pairs of components would be used to extend across substantially the entire width of the belts 22, 32.

Furthermore, in some embodiments of the present invention, the width of the base members 83, 93 is approximately twice the diameter of the rod 70. It is contemplated that these relative dimensions are sufficient to prevent cracking or breaking of the base members 83, 93 during use. With the base members 83, 93 being about one-half the width of the respective flange members 81, 91, as discussed above, in these embodiments the width of the flange members 81, 91 is therefore approximately four times the diameter of the rod 70.

Furthermore, in the exemplary transfer plate 60 shown in FIGS. 2-7, the weight of the first components 80 acts to bias the first components 80 towards the belt 22 of the boom 20, and the weight of the second components 90 acts to bias the second components 90 towards the belt 32 of the penultimate section 18. In other embodiments, and as discussed further below, alternate means of biasing the first components 80 and the second components 90 are also contemplated.

Additionally, and as perhaps best shown in FIGS. 5 and 7, in this exemplary embodiment, each of the first components 80 includes a lower lip 86 that extends from the base member 83 opposite from the distal edge 82 of the flange member 81 of the first component 80. Each of the second components 90 includes a lower edge 96 opposite the distal edge 92 of the flange member 91 of the second component 90. Thus, in use, when the boom 20 is in the substantially horizontal orientation, the lower lip 86 of the first component 80 contacts the lower edge 96 of the second component 90, and the upper surface 62 of the first component 80 is substantially aligned with the upper surface 64 of the second component 90, so as to provide a substantially flat continuous surface between the belt 22 of the boom 20 and the belt 32 of the penultimate section 18.

In some embodiments, the second component 90 is preferably heavier than the first component 80, and thus applies a weight or biasing force to the first component 80 via the interaction with the lower lip 86, which, in use, causes the distal edge 82 of the first component to be raised slightly above the surface of the belt 22 when the boom 20 is in the substantially horizontal orientation.

Referring now to FIGS. 8-11, in another exemplary transfer plate 160 made in accordance with the present invention, a plurality of first components 180 and a plurality of second components 190 are again arranged along the length of the rod 170, with one first component 180 and one second component 190 forming a pair in a similar manner to the exemplary transfer plate 60 described above with respect to FIGS. 2-7. However, in this embodiment, each of the first components 180 includes multiple base members 183a, 183b, 183c (labeled in FIGS. 9-11) joined to and connected by a single flange member 181. Likewise, each of the plurality of second components 190 includes multiple base members 193a, 193b, 193c (labeled in FIGS. 9-11) joined to and connected by a single flange member 191. Each of the multiple base members 183a, 183b, 183c of each first component 180 defines a hole 184a, 184b, 184c (labeled in FIGS. 9 and 11) which accepts the rod 170. Similarly, each of the multiple base members 193a, 193b, 193c of each second component 190 defines a hole 194a, 194b, 194c (labeled in FIGS. 9 and 11) which accepts the rod 170. In this way, each first component 180 is mounted on and can rotate with respect to the rod 170, such that, in use, the position of the flange member 181 is maintained adjacent to the belt 22 of the boom 20, with a distal edge 182 of the flange member 181 extending over the belt 22 of the boom 20. At the same time, each of the second components 190 remains properly positioned over and adjacent to the belt 32 of the penultimate section 18 of the extendible belt conveyor 10.

Referring still to FIGS. 8-11, the width of each of the multiple base members 183a, 183b, 183c of each first component 180 is substantially equal to the width of each of the multiple base members 193a, 193b, 193c of each second component 190. Furthermore, the width of each of the multiple base members 183a, 183b, 183c of each first component 180 and the width of each of the multiple base members 193a, 193b, 193c of each second component 190 is about one-third of the width of the respective flange members 181, 191. Accordingly, similar to the exemplary transfer plate 60 described above with respect to FIGS. 2-7, in this exemplary embodiment, the distal edges 182 of the plurality of first components 180 would still collectively extend across substantially an entire width of the belt 22 of the boom 20, and the distal edges 192 of the plurality of second components 190 would still collectively extend across substantially an entire width of the belt 32 of the penultimate section 18. However, only four pairs of first and second components 180, 190 would be needed to extend across substantially the entire width of the belts 22, 32 of the exemplary extendible belt conveyor 10 shown in FIG. 2. Once again, the particular number of pairs is not limited and can be chosen based on the width of the first and second components 180, 190 as compared to the width of the belt 22 of the boom 20 and the width of the belt 32 of the penultimate section 18.

Figure 8:
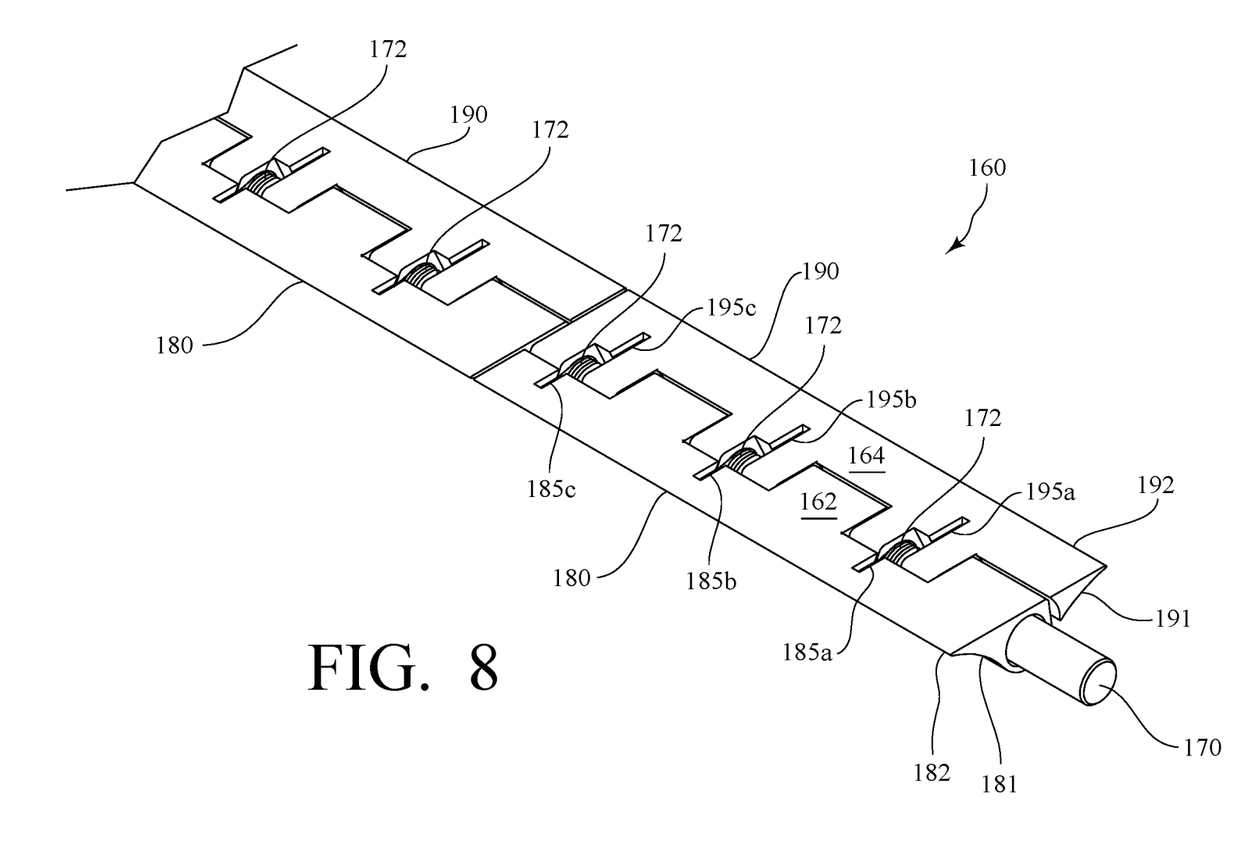
FIG. 8 is a partial top perspective view of another exemplary transfer plate made in accordance with the present invention.
Figure 9:
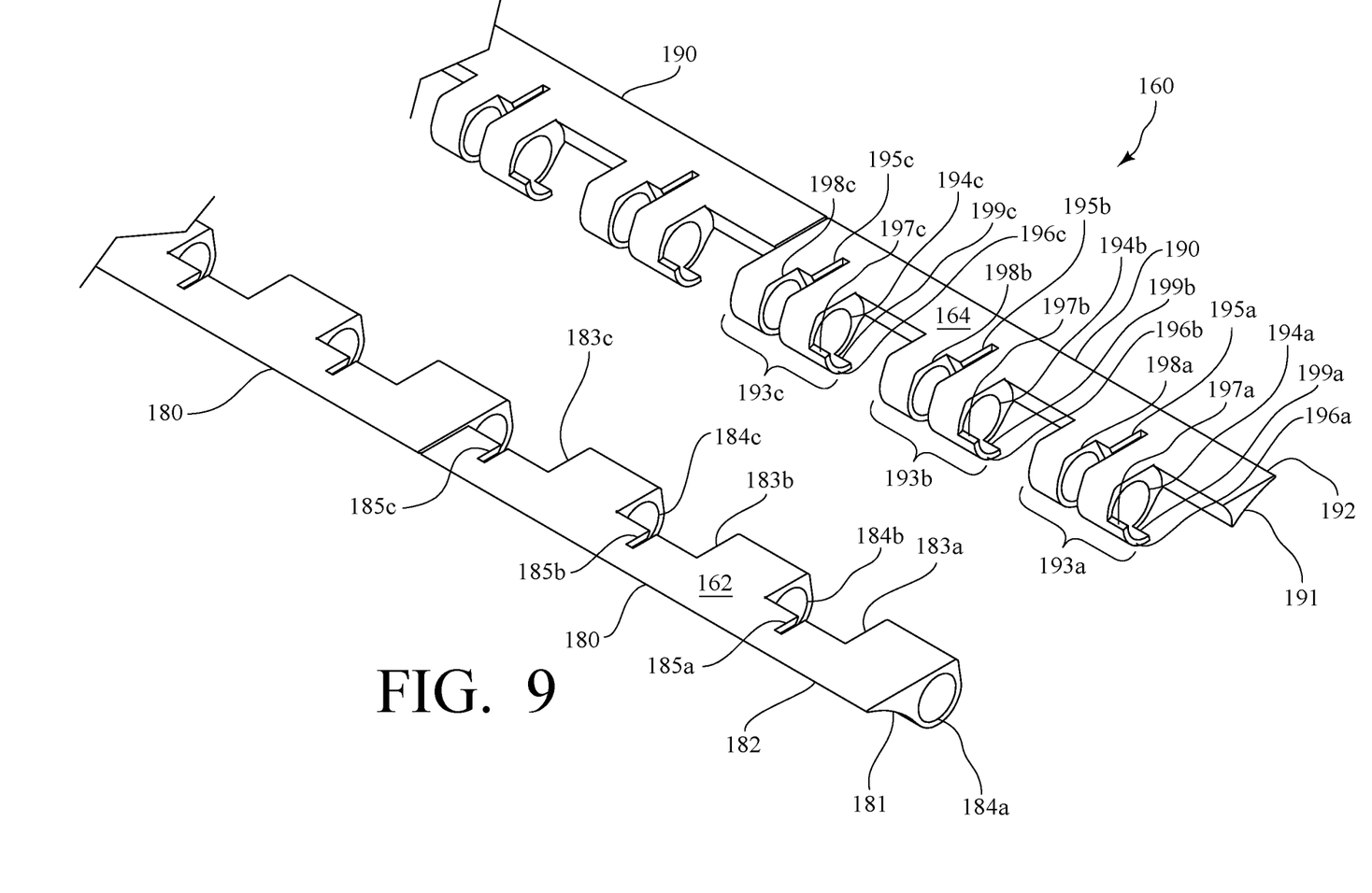
FIG. 9 is a partial exploded perspective view of the exemplary transfer plate of FIG. 8.
Figure 10:
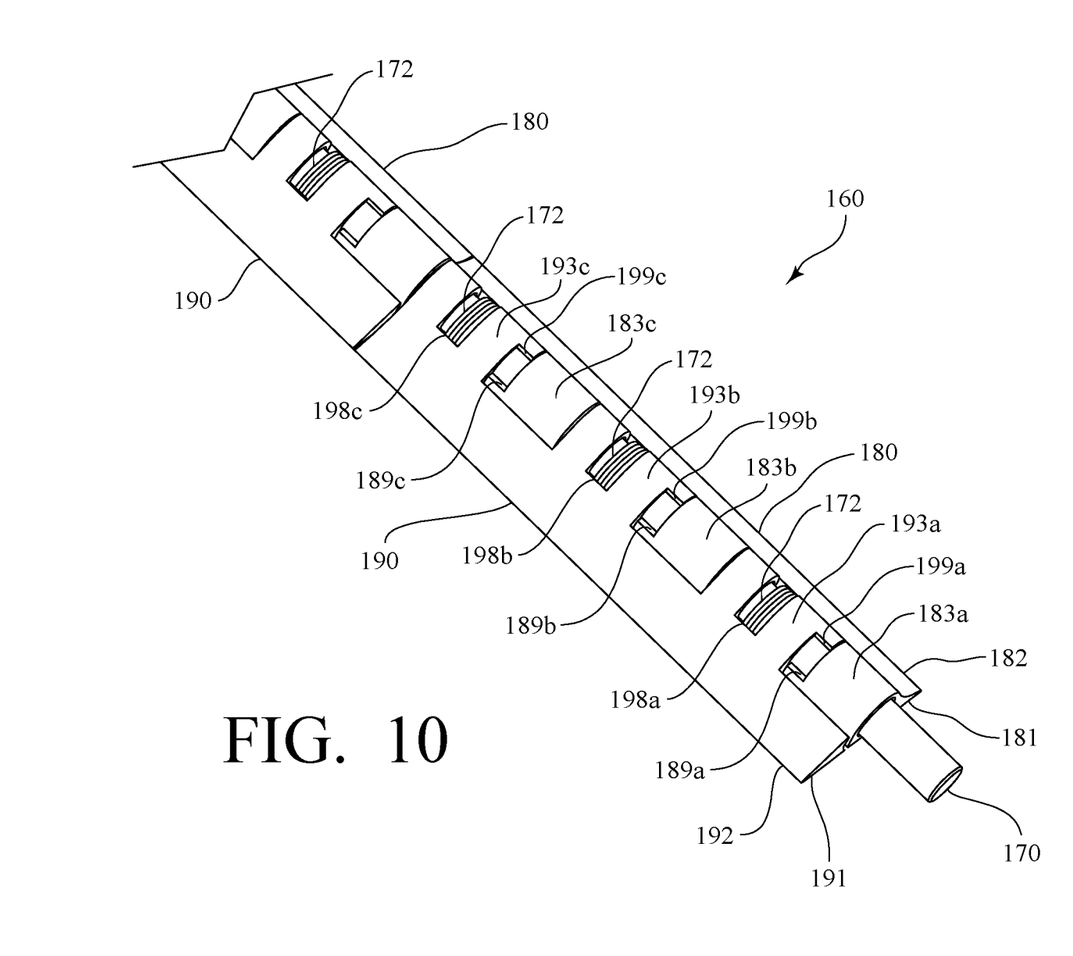
FIG. 10 is a partial bottom perspective view of the exemplary transfer plate of FIG. 8.
Figure 11:
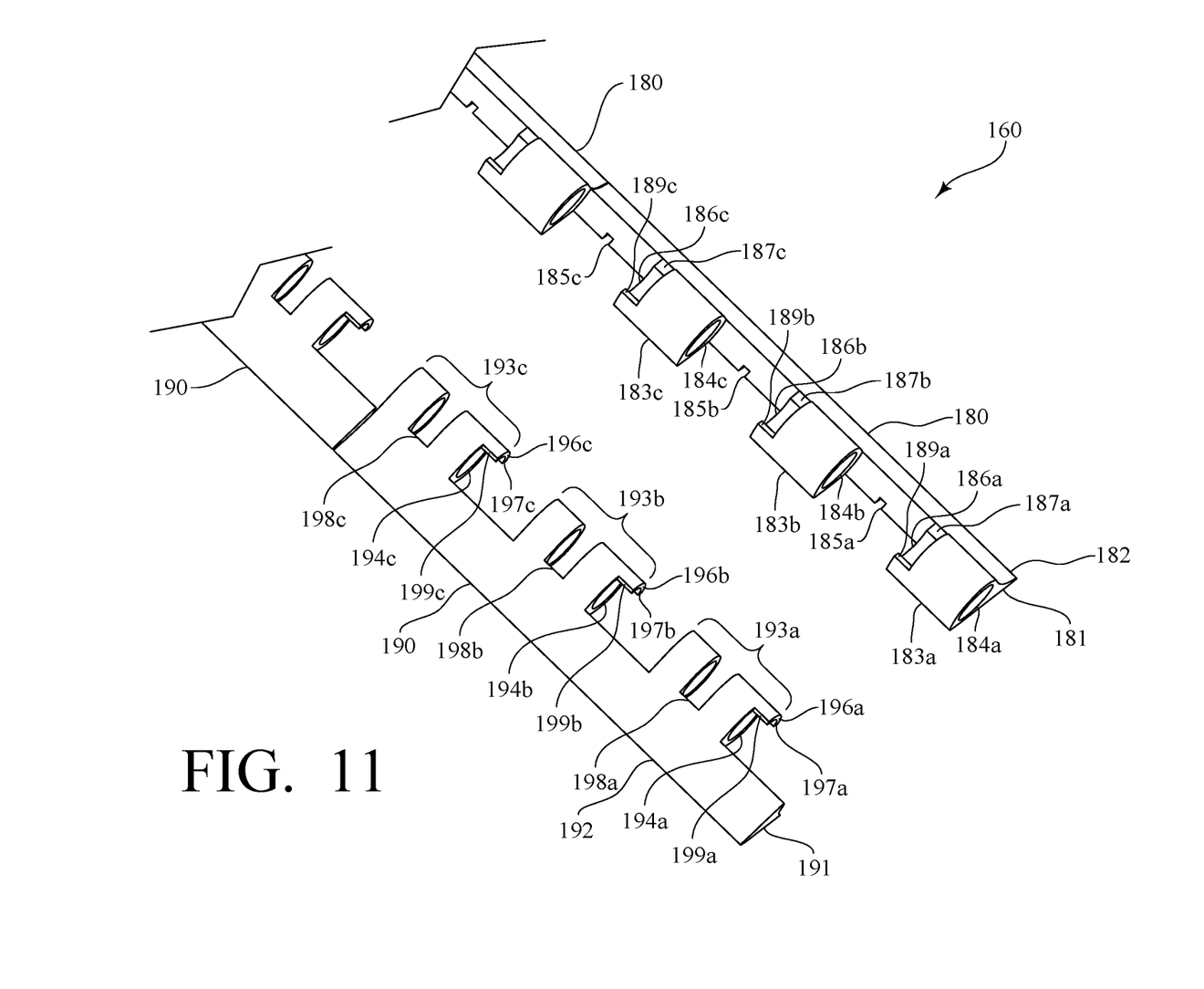
FIG. 11 is another exploded perspective view of the exemplary transfer plate of FIG. 8.

As best shown in FIGS. 8 and 10, in this exemplary embodiment, the transfer plate 160 further includes torsion springs 172 that each engage one of the plurality of first components 180 and one of the plurality of second components 190 to bias the first component 180 towards the belt 22 of the boom 20 and the second component 190 towards the belt 32 of the penultimate section 18. To this end, each of the base members 193a, 193b, 193c of the second component 190 defines a gap 198a, 198b, 198c (labeled in FIGS. 9-11), with each of the gaps 198a, 198b, 198c housing the body of one of the torsion springs 172. Furthermore, the flange member 181 of each first component 180 defines multiple channels 185a, 185b, 185c (labeled in FIGS. 8-9 and 11) adjacent to the upper surface 162 of the first component 180, which each house one of the ends of a torsion spring 172. Similarly, the flange member 191 of each second component 190 defines channels 195a, 195b, 195c (labeled in FIGS. 8-9) adjacent to the upper surface 164 of the second component 190, which each house the other end of a torsion spring 172.

Of course, it is contemplated that a torsion spring could be similarly used with each pair of a first component 80 and a second component 90 of in the exemplary transfer plate 60 described above with respect to FIGS. 2-7 to bias the respective first and second components 80, 90 in substantially the same manner as the torsion springs 172 shown in FIGS. 8-11.

Referring still to FIGS. 8-11, unlike the exemplary transfer plate 60 described above with respect to FIGS. 2-7, in the exemplary transfer plate 160, the multiple base members 183a, 183b, 183c of each first component 180 do not have a lower lip. Similarly, the multiple base members 193a, 193b, 193c of each second component 190 do not have a lower edge. Rather, each of the multiple base members 183a, 183b, 183c of each first component 180 has a stop 186a, 186b, 186c (labeled in FIG. 11) that extends from the base member 183a, 183b, 183c in the axial direction of the rod 170 (i.e., in a direction parallel to the axis of the rod 170), and each of the multiple base members 193a, 193b, 193c of each second component 190 also has a stop 196a, 196b, 196c (labeled in FIGS. 9 and 11) that extends from the base member 193a, 193b, 193c in the axial direction of the rod 170, with the stops 186a, 186b, 186c, 196a, 196b, 196c interacting to limit rotation of the first component 180 relative to the second component 190.

In particular, when the multiple base members 183a, 183b, 183c of a first component 180 are positioned on the rod 170 in the alternating relationship with the multiple base members 193a, 193b, 193c of a second component 190, as shown, for example, in FIGS. 8 and 10, the stops 186a, 186b, 186c of the first component 180 overlap with the stop 196a, 196b, 196c of the second component 190. The torsion spring 172 biases the first component 180 and the second component 190 of each pair, such that a first surface 187a, 187b, 187c (shown in FIG. 11) of each stop 186a, 186b, 186c of the first component 180 contacts a first surface 197a, 197b, 197c (shown in FIGS. 9 and 11) of each stop 196a, 196b, 196c of the second component 190, and the upper surface 162 of the first component 180 is substantially aligned with the upper surface 164 of the second component 190, so as to provide a substantially flat continuous surface between the belt 22 of the boom 20 and the belt 32 of the penultimate section 18. Although not shown, it should be appreciated that when a second surface 189a, 189b, 189c (shown in FIGS. 10-11) of each stop 186a, 186b, 186c of the first component 180 contacts a second surface 199a, 199b, 199c (shown in FIGS. 9-11) of each stop 196a, 196b, 196c of the second component 190, the upper surface 162 of the first component 180 is oriented at an angle relative to the upper surface 164 of the second component 190, for example at an angle of about 90°. In other words, the stops 186a, 186b, 186c of the first component 180 interact with the stops 196a, 196b, 196c of the second component 190 to define the full range of rotation of the first component 180 relative to second components 190 in each pair, preventing further rotation in either direction. Importantly, the stops 186a, 186b, 186c of each first component 180 interact with the stops 196a, 196b, 196c of each second component 190 to prevent the first component 180 and the second component 190 from pressing into the belts 22, 32 in order to reduce wear during operation.

Although not shown in the above-described Figures, as a further refinement, it is contemplated that compression springs or similar biasing means could be installed on either end of the rods 70, 170 to maintain the first components 80, 180 and the second components 90, 190 together in a side-by-side relationship.

One of ordinary skill in the art will recognize that additional embodiments and implementations are also possible without departing from the teachings of the present invention. This detailed description, and particularly the specific details of the exemplary embodiments and implementations disclosed therein, is given primarily for clarity of understanding, and no unnecessary limitations are to be understood therefrom, for modifications will become obvious to those skilled in the art upon reading this disclosure and may be made without departing from the spirit or scope of the invention.

What is claimed is:

1. An extendible belt conveyor, comprising:
   one or more conveying sections, including a penultimate section having a roller at a distal end, with a belt operated by the roller;
   a boom mounted for pivotal movement with respect to the penultimate section, the boom including a roller at a proximal end positioned adjacent to the distal end of the penultimate section, with a belt operated by the roller; and
   a transfer plate spanning a gap between the belt of the boom and the belt of the penultimate section, said transfer plate including
      a rod positioned between the boom and the penultimate section and extending substantially parallel to the roller of the boom and the roller of the penultimate section,
      a plurality of first components that each include a base member mounted on and rotatable with respect to the rod and a flange member extending from the base member and positioned adjacent to the belt of the boom, with a distal edge of the flange member extending over the belt of the boom, and
      a plurality of second components that each include a base member mounted on and rotatable with respect to the rod and a flange member extending from the base member and positioned adjacent to the belt of the penultimate section, with a distal edge of the flange member extending over the belt of the penultimate section;
   wherein, in use, as the boom pivots with respect to the penultimate section, an upper surface of the plurality of first components remains substantially parallel to the belt of the boom, and an upper surface of the plurality of second components remains substantially parallel to the belt of the penultimate section.

2. The extendible belt conveyor as recited in claim 1, wherein the base members of the plurality of first components are arranged in an alternating relationship with the base members of the plurality of second components along the rod.

3. The extendible belt conveyor as recited in claim 1, wherein the distal edges of the plurality of first components collectively extend across substantially an entire width of the belt of the boom, and wherein the distal edges of the plurality of second components collectively extend across substantially an entire width of the belt of the penultimate section.

4. The extendible belt conveyor as recited in claim 1, wherein each of the plurality of first components includes multiple base members joined to and connected by a single flange member, and wherein each of the plurality of second components includes multiple base members joined to and connected by a single flange member, with each of the multiple base members of the plurality of first components arranged in an alternating relationship with each of the multiple base members of the plurality of second components along the rod.

5. The extendible belt conveyor as recited in claim 4, wherein the distal edges of the plurality of first components collectively extend across substantially an entire width of the belt of the boom, and wherein the distal edges of the plurality of second components collectively extend across substantially an entire width of the belt of the penultimate section.

6. The extendible belt conveyor as recited in claim 1,
   wherein each of the plurality of first components further includes a lower lip that extends from the base member opposite from the distal edge of the flange member of the first component;
   wherein each of the plurality of second components further includes a lower edge opposite the distal edge of the flange member of the second component; and
   wherein, when the lower lip of one of the plurality of first components contacts the lower edge of a corresponding one of the plurality of second components, the upper surface of the first component is substantially aligned with the upper surface of the second component, so as to provide a substantially flat continuous surface between the belt of the boom and the belt of the penultimate section.

7. The extendible belt conveyor as recited in claim 6, wherein each of the plurality of second components provides a biasing force via its interaction with the lower lip of a corresponding one of the plurality of first components, which, in use, causes the distal edge of the first component to be raised slightly above a surface of the belt of the boom when the boom is in a substantially horizontal orientation.

8. The extendible belt conveyor as recited in claim 1, and further comprising a plurality of springs, with each spring engaging one of the plurality of first components and one of the plurality of second components, such that the plurality of first components are biased towards the belt of the boom, and the plurality of second components are biased towards the belt of the penultimate section.

9. The extendible belt conveyor as recited in claim 1,
   wherein each of the plurality of first components has a stop that extends from the base member in an axial direction of the rod, and each of the plurality of second components has a stop extending from the base member in the axial direction of the rod; and
   wherein, when a first surface of the stop of one of the plurality of first components contacts a first surface of the stop of one of the plurality of second components, the upper surface of the first component is substantially aligned with the upper surface of the second component, so as to provide a substantially flat continuous surface between the belt of the penultimate section and the belt of the boom.

10. The extendible belt conveyor as recited in claim 9, wherein, when a second surface of the stop of the one of the plurality of first components contacts a second surface of the stop of the one of the plurality of second components, the upper surface of the first component is oriented at an angle relative to the upper surface of the second component, with the respective stops preventing further rotation of the one of the plurality of first components relative to the one of the plurality of second components.

11. A transfer plate for an extendible belt conveyor with a boom mounted for pivotal movement with respect to a penultimate section of the extendible belt conveyor, the transfer plate configured for spanning a gap between a belt of the boom and a belt of the penultimate section, said transfer plate comprising:
   a rod positioned between the boom and the penultimate section;
   a plurality of first components that each include a base member mounted on and rotatable with respect to the rod and a flange member extending from the base member and positioned adjacent to the belt of the boom, with a distal edge of the flange member extending over the belt of the boom; and
   a plurality of second components that each include a base member mounted on and rotatable with respect to the rod and a flange member extending from the base member and positioned adjacent to the belt of the penultimate section, with a distal edge of the flange member extending over the belt of the penultimate section;
   wherein, in use, as the boom pivots with respect to the penultimate section, an upper surface of each of the plurality of first components remains substantially parallel to the belt of the boom, and an upper surface of each of the plurality of second components remains substantially parallel to the belt of the penultimate section.

12. A transfer plate for an extendible belt conveyor with a boom mounted for pivotal movement with respect to a penultimate section of the extendible belt conveyor, the transfer plate configured for spanning a gap between a belt of the boom and a belt of the penultimate section, said transfer plate comprising:
   a rod positioned between the boom and the penultimate section;
   a plurality of first components that each include multiple base members mounted on and rotatable with respect to the rod joined to and connected by a single flange member positioned adjacent to the belt of the boom, with a distal edge of the flange member extending over the belt of the boom; and
   a plurality of second components that each include multiple base members mounted on and rotatable with respect to the rod joined to and connected by a single flange member positioned adjacent to the belt of the penultimate section, with a distal edge of the flange member extending over the belt of the penultimate section;
   wherein, in use, each of the multiple base members of the plurality of first components is arranged in an alternating relationship with each of the multiple base members of the plurality of second components along the rod;
   wherein, in use, as the boom pivots with respect to the penultimate section, an upper surface of each of the plurality of first components remains substantially parallel to the belt of the boom, and an upper surface of each of the plurality of second components remains substantially parallel to the belt of the penultimate section.

13. The transfer plate as recited in claim 12, wherein, in use, the distal edges of the plurality of first components collectively extend across substantially an entire width of the belt of the boom, and wherein the distal edges of the plurality of second components collectively extend across substantially an entire width of the belt of the penultimate section.

14. The transfer plate as recited in claim 12,
- wherein each of the plurality of first components has a stop extending from each of the multiple base members in an axial direction of the rod and each of the plurality of second components has a stop extending from each of the multiple base members in the axial direction of the rod; and
- wherein, when a first surface of the stops of one of the plurality of first components contacts a first surface of the stops of one of the plurality of second components, the upper surface of the first component is substantially aligned with the upper surface of the second component so as to provide a substantially flat continuous surface; and
- wherein, when a second surface of the stops of the one of the plurality of first components contacts a second surface of the stops of the one of the plurality of second components, the upper surface of the first component is oriented at an angle relative to the upper surface of the second component, with the respective stops preventing further rotation of the one of the plurality of first components relative to the one of the plurality of second components.

\* \* \* \* \*